Sept. 1, 1936.  P. A. RAICHE  2,052,657
MANUFACTURE OF NIPPLES
Filed Feb. 5, 1934  2 Sheets-Sheet 1

Inventor
Paul A. Raiche
By Nathaniel Frucht
his Attorney

Sept. 1, 1936.   P. A. RAICHE   2,052,657
MANUFACTURE OF NIPPLES
Filed Feb. 5, 1934   2 Sheets-Sheet 2
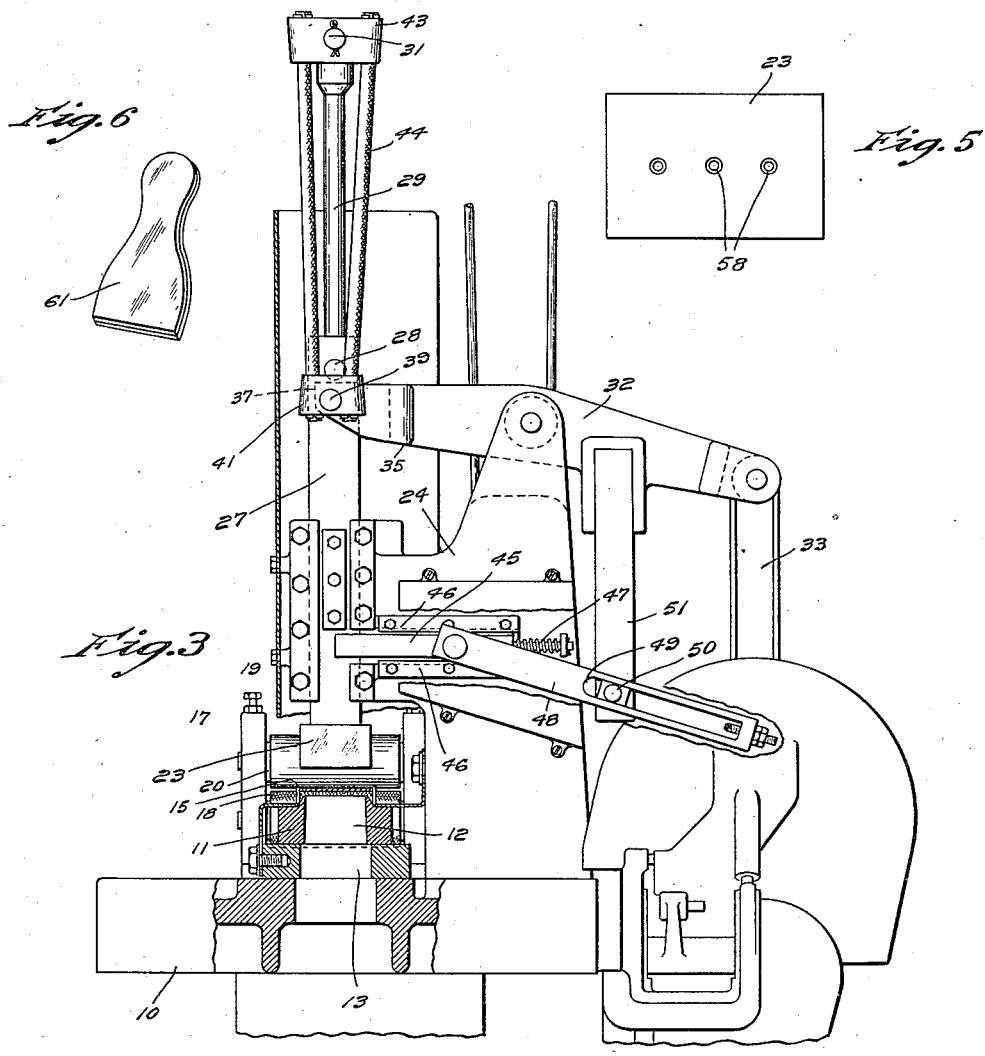
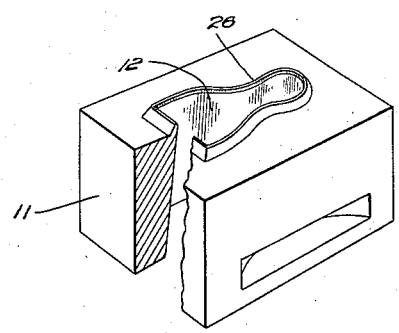
Inventor
Paul A. Raiche
By Nathaniel Frucht
his Attorney Patented Sept. 1, 1936

2,052,657

UNITED STATES PATENT OFFICE 2,052,657

MANUFACTURE OF NIPPLES

Paul A. Raiche, Providence, R. I., assignor to Davol Rubber Company, a corporation of Rhode Island Application February 5, 1934, Serial No. 709,760

10 Claims. (Cl. 164—22)

My present invention relates to the manufacture of rubber articles, and has particular reference to the manufacture of rubber nipples.

The initial step in the manufacture of rubber articles such as nipples comprises the formation of a blank by cutting or stamping. This cutting or stamping has heretofore been accomplished by means of hand cutters, as the uncured material heretofore was not believed to have the qualities necessary for automatic high speed machine cutting, and particularly in view of the intermittent movement of the cutter element.

It is the principal object of my invention to provide a novel method and a novel apparatus for the manufacture of nipples, by providing automatic high speed cutting of rubber blanks. To this end, I have utilized the natural resilience of the rubber stock to permit a continuous feed of blank material with an intermittent blanking operation. Actual operating conditions have shown that there is a correlation between the qualities of the rubber stock, and particularly its resilience, and the speed of feed, wherefore it has been found advisable to so adjust the speed of feed as to accord with the rubber stock to be blanked.

Moreover, it has been found advisable to remove the blank from the stock after each blanking operation, and to automatically lift the blanked stock away from the die block in order to permit feed.

With the above and other objects and advantageous features in view, my invention consists of a novel method of operation and a novel arrangement of parts more fully disclosed in the detailed description following, in conjunction with the accompanying drawings, and more specifically defined in the claims appended thereto.

In the drawings,

Fig. 3 is a side elevation, parts being broken away and shown in section;

Fig. 5 is an enlarged bottom plan view of the punch;

Fig. 6 is a perspective of the blank; and

Fig. 7 is a perspective of the die, partly broken away.

Figure 1:
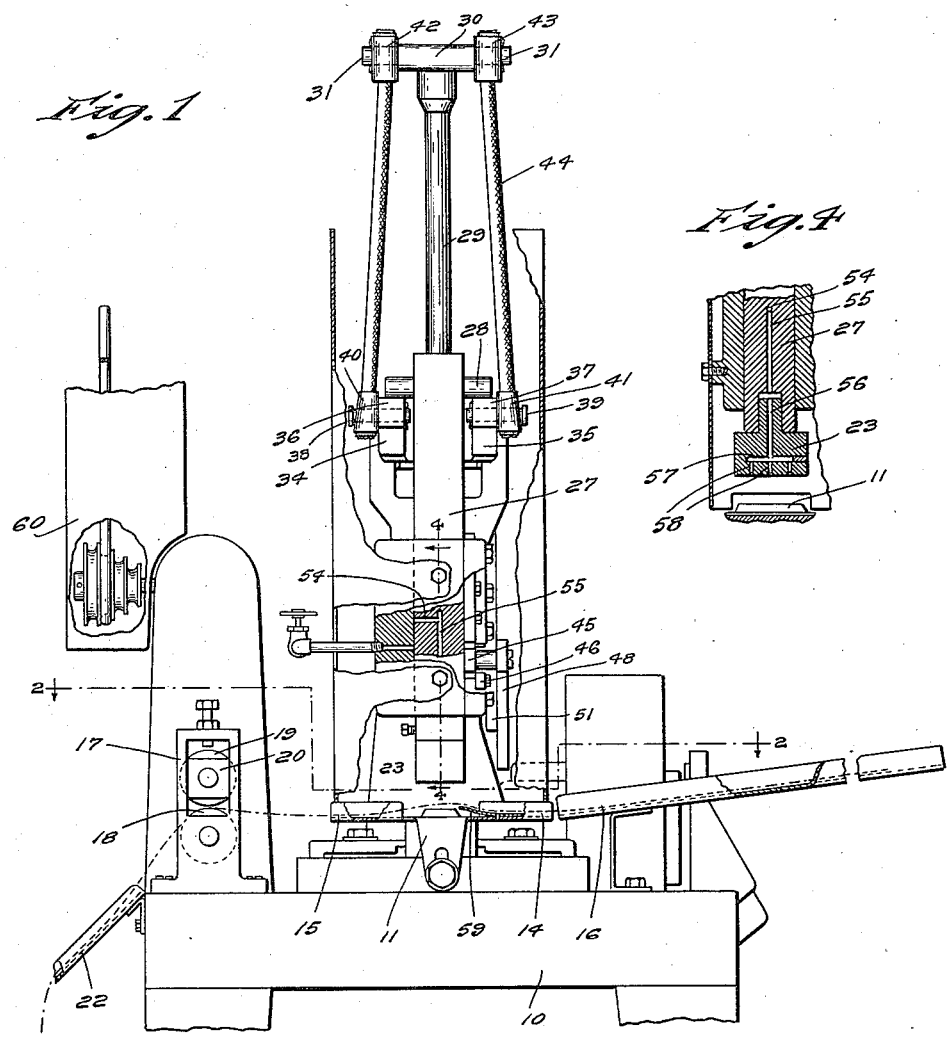
Fig. 1 is a front elevation of the novel apparatus, parts being broken away.

It has been found possible to automatically cut or stamp blanks of yielding or resilient material, such as rubber, by utilizing a positive continuous feed which is set to correspond with the qualities of the material to be blanked, and by removing the blanks and releasing the scrap from the blanking die, whereby the momentary stop of the material during the blanking operation and the resultant stretching due to the continuous feed are absorbed by the material itself, and particularly because of the resilience thereof. The cutting of the blank as above described facilitates the subsequent operations for completing the manufacture of the article.

Referring to the drawings, a novel blanking machine is provided, having a base 10 on which a die plate 11 is detachably mounted, the die plate and base having aligned openings 12, 13 for receiving the blanks as hereinafter described. Two guide channels 14, 15 are positioned on each side of the die plate, and a feed trough 16 conducts the stock to be blanked to the first guide channel; the scrap material passes from the die plate through the second guide channel to a positive feed mechanism 17 comprising a rotatably mounted knurled or roughened lower roll 18 which is positively driven, and a gravity actuated smooth vertically movable upper roll 19 which is rotatably mounted in end blocks 20, these end blocks being vertically slidable in suitable vertical channels 21; the scrap material is conveyed from the rolls through a chute 22 to a scrap receiving basket.

Cooperating with the die plate 11 is a reciprocatable hammer 23 mounted for vertical movement in a support standard 24, the hammer comprising a generally flat base 25, see Fig. 5, which impacts on the lands 26 of the die plate, and a vertical shank 27 which is suitably guided in the support standard. The upper end of the shank has a pin 28 extending laterally therethrough, and has a spring support rod 29 extending vertically and terminating in a horizontal spring support bar 30 which has cylindrical pivot ends 31.

The hammer operating mechanism includes a lever 32 which is pivotally mounted on the support standard, and is actuated by means of an oscillating crank arm 33 of standard type with its lower end secured to a rotating crank pin, not shown. The hammer end of the lever 32 is bifurcated, see Fig. 1, the two ends 34, 35 extending on opposite sides of the hammer shank and having support bosses 36, 37 through which pivot pins 38, 39 are mounted. Spring holders 40, 41 are mounted on the pivot pins 38, 39, and similar spring holders 42, 43 of larger size are mounted on the pivot ends 31, these holders having tapered openings and tapered split bushings, not shown, in which the ends of the springs 44 are seated and firmly locked. The springs are preferably formed of sets of longitudinal rubber strands, textile covered.

A plunger 45, see Fig. 3, is reciprocatingly mounted in guides 46 formed integral with or secured to the side of the support standard, and is spring held in hammer holding position by a compression spring 47; the plunger 45 is periodically moved back by a lever 48 which is secured thereto and has an end slot 49 in which a pin 50 secured to an arm 51 is received, the arm 51 being locked at its upper end to the lever 32 and therefore swinging in an arc as the lever 32 oscillates.

Figure 4:
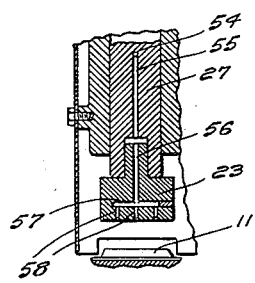
Fig. 4 is a vertical sectional detail on the line 4—4 of Fig. 1.

Referring now to Figs. 1 and 4 it will be noted that the support standard has a lateral passageway 52 which receives a valve controlled compressed air conduit 53, and that the hammer shank has a lateral passage 54 which communicates with a vertical passage 55, to thus conduct compressed air to a vertical passage 56, a cross passage 57, and a plurality of vertical outlets 58 in the hammer, whereby the completion of the blanking stroke of the hammer connects the passages 52 and 54 and thus permits compressed air under high pressure, in the neighborhood of 125 lbs. per sq. in., to force the blank down through the openings provided in the die plate and the base, and into a receptacle such as a chute in which the blanks are stacked in alignment.

Figure 2:
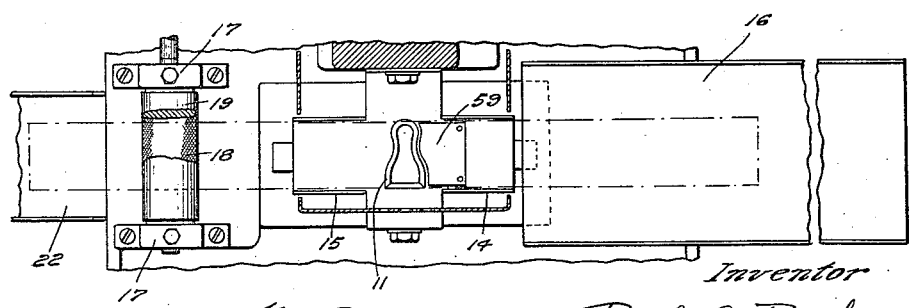
Fig. 2 is a plan view on the line 2—2 of Fig. 1, parts being broken away and shown in section.

Referring now to Figs. 1 and 2, it will be noted that a spring plate 59 is secured in the guide passageway 14, with its free edge closely adjacent and normally slightly above the die plate, but in the path of the descending hammer, whereby the hammer presses the spring plate down on the blanking stroke and the spring plate lifts up and releases the scrap after the blanking stroke has been made, thus permitting movement of the material in response to the pull of the feed rolls. Since the pull of the feed rolls must be adjusted to suit the qualities of the material to be blanked, the lower roll 18 is positively driven by a regulatable speed mechanism, the preferred mechanism 60, see Fig. 1, including a cone pulley for changing the feeding speed.

The operation of the novel blanking machine is now clear; the rubber stock is fed over the die plate by the continuously rotating feed rolls, and the hammer is held by the plunger until the spring tension is maximum, the plunger then withdrawing to release the hammer which snaps down to cut the blank, the side of the hammer engaging the spring plate on the down stroke to force it down below the die lands. As the blanking stroke is completed, the compressed air conduits are placed in communication, and the cut blank is blown down through the die plate and the base to the blank receiving trough. The feed rolls at this moment have placed the strip between the rolls and the die, now a scrap strip, under tension; as the hammer rises, the spring plate also rises to lift the strip up from the die plate, and the scrap strip moves towards the feed rolls and brings a full portion of the material strip over the die plate for a repetition of the blanking operation.

When manufacturing nipples, the material strip is doubled in order to provide a composite blank 61 formed of two contiguous nipple blanks; the side edges of the composite blanks are then coated with cement, the nipple parts are opened, and the opened blank is passed over an anvil die with reciprocating jaws engaging the side edges so as to abut the coated side edges; the abutted blank is then inspected and the base cemented for rolling, and is then ready for curing.

The inspection is preferably semi-automatic; the opened and abutted blanks are set on pins which are mounted on carrier disks forming part of a conveyor, the disks passing between vertical magnifying glasses and rotating as they pass so as to bring the entire nipple to the view of the inspectors who are looking through the magnifying glasses.

It is evident that the operation of blanking as hereinbefore described has been made automatic, thus reducing the cost while standardizing the resulting product. The time for blanking is greatly reduced, from an average of 50 to 60 per minute for hand blanking, to an average in excess of 300 per minute for machine blanking.

While I have described a specific constructional embodiment of an apparatus for producing blanks from resilient material, such changes in the size and arrangement of the parts and in their functions as appear desirable for blanks of different shape or form, or of different material, may be made to suit the requirements for manufacturing other articles, within the spirit and the scope of the invention as defined in the appended claims.

I claim:

1. A method of cutting blanks from resilient stock, comprising subjecting said stock to an uninterrupted continuously acting freely feeding pull, while intermittently cutting blanks therefrom by reciprocating a cutter at right angles thereto without interrupting the free feeding pull, the feeding pull being regulated to correspond to the stock resilience.

2. A method of cutting blanks from resilient stock, comprising subjecting said stock to an uninterrupted continuously acting freely feeding pull, while intermittently cutting blanks therefrom by reciprocating a cutter at right angles thereto without interrupting the free feeding pull, the feeding pull being regulated to correspond to the stock resilience and the rate of blank cutting.

3. A method of cutting blanks from resilient stock, comprising feeding said stock at an uninterrupted free feeding pull to subject the stock to substantially continuous constant tension, intermittently cutting blanks therefrom by reciprocating a cutter at right angles thereto, and removing the cut blanks from the remaining stock by subjecting the cut blanks to air under pressure.

4. In combination, a blanking machine having a stationary die and a reciprocatable hammer, means for feeding a strip of resilient material between said die and hammer at an uninterrupted continuous free feeding pull, and means for periodically reciprocating said hammer at right angles to said strip without interrupting the free feeding pull to cut blanks from said strip.

5. In combination, a blanking machine having a stationary die and a reciprocatable hammer, means for feeding a strip of resilient material between said die and hammer at an uninterrupted continuous free feeding pull, means for periodically reciprocating said hammer at right angles to said strip without interrupting the free feeding pull to cut blanks from said strip, and means for removing the cut blanks from said strip.

6. In combination, a blanking machine having a stationary die and a reciprocatable hammer, means for feeding a strip of resilient material between said die and hammer at a continuous pull, means for periodically reciprocating said hammer to cut blanks from said strip, and means for lifting the strip from said die after each hammer reciprocation.

7. In combination, a blanking machine having a stationary die and a reciprocatable hammer, means for feeding a strip of resilient material between said die and hammer at a continuous pull, means for periodically reciprocating said hammer to cut blanks from said strip, and means comprising a resilient plate beneath the strip for lifting the strip from said die after each hammer reciprocation.

8. In combination, a blanking machine having a stationary die and a reciprocatable hammer, means for feeding a strip of resilient material between said die and hammer at a continuous pull, means for periodically reciprocating said hammer to cut blanks from said strip, and means comprising a resilient plate beneath the strip adapted to be depressed by the hammer on its blanking stroke and rising upon upward movement of the hammer for lifting the strip from said die after each hammer reciproation.

9. In a blanking machine, a stationary die and a reciprocatable hammer, said die having a blank receiving aperture, means for feeding a strip of material under continuous tension between said die and hammer, means for reciprocating said hammer to cut blanks from the strip, and means for subjecting the cut blanks to a blast of air under pressure, whereby the cut blanks are forced through said die aperture.

10. In a blanking machine, a stationary die and a reciprocatable hammer, said die having a blank receiving aperture and said hammer having a compressed air passageway, means for feeding a strip of material under continuous tension between said die and hammer, means for reciprocating said hammer to cut blanks from the strip, and means for communicating said passageway with air under pressure to subject the cut blanks to a blast of air under pressure, whereby the cut blanks are forced through said die aperture.

PAUL A. RAICHE.